United States Patent
Grover et al.

(10) Patent No.: US 6,654,379 B1
(45) Date of Patent: Nov. 25, 2003

(54) INTEGRATED RING-MESH NETWORK

(75) Inventors: Wayne D. Grover, Edmonton (CA); Randy G. Martens, Garland, TX (US)

(73) Assignee: Telecommunications Research Laboratories, Edmonton (CA)

( * ) Notice: Subject to any disclaimer, the term of this patent is extended or adjusted under 35 U.S.C. 154(b) by 0 days.

(21) Appl. No.: 09/414,474

(22) Filed: Oct. 7, 1999

Related U.S. Application Data

(60) Provisional application No. 60/103,531, filed on Oct. 8, 1998.

(51) Int. Cl.$^7$ ............................................. H04L 12/28
(52) U.S. Cl. ...................................... 370/406; 370/223
(58) Field of Search ................................ 370/222, 223, 370/254, 258, 406, 407, 408, 224; 709/251, 252

(56) References Cited

U.S. PATENT DOCUMENTS

| | | | | |
|---|---|---|---|---|
| 5,179,548 | A | * | 1/1993 | Sandesara .................... 370/406 |
| 5,515,367 | A | * | 5/1996 | Cox et al. .................... 370/404 |
| 6,038,044 | A | * | 3/2000 | Fee et al. .................... 359/119 |
| 6,226,111 | B1 | * | 5/2001 | Chang et al. ................ 359/119 |
| 6,229,815 | B1 | * | 5/2001 | Huang et al. ................ 370/437 |
| 6,385,201 | B1 | * | 5/2002 | Iwata ........................... 370/400 |

OTHER PUBLICATIONS

I. Saniee "Optimum Routing Designs in Self–Healing Communications Networks," Bellcore Paper, May, 1994.

* cited by examiner

Primary Examiner—Chau Nguyen
Assistant Examiner—Keith M. George
(74) Attorney, Agent, or Firm—Flynn, Thiel, Boutell & Tanis, P.C.

(57) ABSTRACT

Whether in a SONET or a dense-WDM (DWDM) transport environment, we can expect to see a continuance of the two main survivable architectures: ring and mesh. The differing advantages of these technologies has allowed both of them to find applications, although they are usually deployed and operate quite separately. To date, the problem of optimally combining ring and mesh technologies into a single integrated transport design remains largely unstudied. This patent document presents a planning principle and related optimization theory to strategically embed rings into a mesh network, with the purpose of obtaining a lower total design cost than that of either a pure-mesh or pure-ring design. The new design approach is based on a recently developed insight into the nature of spare capacity requirements in a mesh-restorable network. So-called "forcer" analysis identifies the spans that drive the dimensioning of spare quantities in the network. The main hypothesis is that strategic placement of rings onto these spans, can result in mesh sparing relief that more than pays for the cost of the rings. However, the very large number of possible ring placements and sizes, makes this a difficult combinatorial optimization problem. Both heuristic and Integer Programming approaches were used to solve the problem. Results show cases of hybrid designs that are 5 to 25% less costly than that of a pure mesh design, depending on the test network and the relative mesh-ring technology costs. The Integer Programming method worked well for networks with fewer nodes and spans, while the heuristic was needed to obtain good solutions for relatively larger networks.

6 Claims, 7 Drawing Sheets

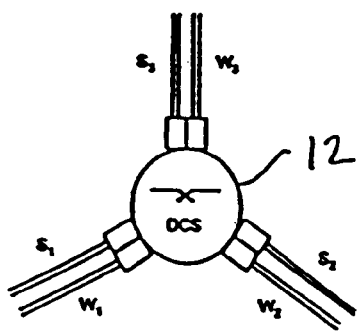
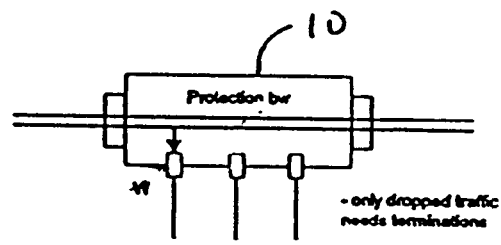
DCS mesh
Termination costs ↑
Network redundancy ↓
FIGURE 7A
SONET rings
Termination costs ↓
Network redundancy ↑
FIGURE 7B

INTEGRATED RING-MESH NETWORK

RELATIONSHIP TO EARLIER FILED APPLICATION

This application claims priority under 35 U.S.C. Sec. 119 from U.S. Provisional Patent Application Ser. No. 60/103,531, filed Oct. 8, 1998.

FIELD OF THE INVENTION

This invention relates to design of telecommunications networks, and in particular to the protection of telecommunications networks against span failure.

BACKGROUND AND SUMMARY OF THE INVENTION

For a few years now, those in industry have been increasingly expressing the desire for those in the research community to address the topic of hybrid (meaning integrated ring-mesh) survivable network design. Both of these basic networking technologies have their strengths and weaknesses. Mesh networks, with their high connectivity and common sparing, are capacity efficient and require minimal redundancy. However, they generally require more costly nodal equipment (DCS verses ADM's), and they also require the line-level termination of all signals (working and spare) at every node. They tend, therefore, to be used for long haul architectures, where cost is more dependent on the total bandwidth-distance product. Rings, on the other hand, tend to be more cost efficient in metro areas, where cost is dominated by nodal equipment. Nodal equipment costs are much lower in rings, since they only terminate dropped traffic. However, there is much more redundancy required in the spare capacity of rings. A design methodology that leads to an optimized balance of the two, would not only guide current and future designs of hybrid networks, but would also reveal cost reduction opportunities in existing pure-ring or pure-mesh systems.

To date, the only clearly recognized principle for combined use of ring and mesh technology, has been that of access rings and a mesh core [2,3]. References in square brackets are listed at the end of the disclosure. In both these papers, rings or ring segments are used as sub-networks for metropolitan network access. This work considers the placement of rings over all parts of the mesh. In other words, this is a far more general approach than what has been previously done in this area.

There is therefore proposed in accordance with an aspect of the invention, a telecommunications network, in which the telecommunications network includes plural nodes interconnected by plural spans, each node having a nodal switching device (DCS or ADM) for making and breaking connections between adjacent spans at the node, all of the nodes of the network being arranged in a mesh network with integrated rings spread throughout the mesh network.

In a further aspect of the invention, there is proposed a method of creating a telecommunications network in which the telecommunications network includes plural nodes interconnected by plural spans, each node having a nodal switching device (DCS or ADM) for making and breaking connections between adjacent spans at the node, comprising the step of arranging the nodes of the network in a mesh network with integrated rings.

In a further aspect of the invention, there is proposed a method of creating a telecommunications network in which the telecommunications network includes plural nodes interconnected by plural spans, each node having a nodal switching device (DCS or ADM) for making and breaking connections between adjacent spans at the node, comprising the step of arranging the nodes of the network to avoid or reduce the deleterious effect of forcer spans.

In a further aspect of the invention, the telecommunications network is a mesh network having at least one forcer span and the method further comprises the steps of
 integrating a ring into the mesh network; and
 reducing the deleterious effect of the forcer span on the capacity design of the mesh network by integration of the ring into the mesh network.

Preferably, integrating a ring into the mesh network comprises the steps of
 identifying a forcer span in the mesh network, and
 placing a ring in the network that makes the forcer span a non-forcer span.

Further, preferably placing a ring in the network that makes the forcer span a non-forcer span comprises the step of:
 evaluating plural ring placements based on the cost of placing each ring in the network.

Still further, a ring is selected for placement in the network that is the most cost effective of the ring placements evaluated. Integer programming or a heuristic may be used to evaluate the ring placements.

BRIEF DESCRIPTION OF THE FIGURES

There will now be described preferred embodiments of the invention, with reference to the drawings, for purposes of illustration only and without intending to limit the scope of the claims, in which drawings like reference characters denote like elements and in which:

FIGS. 7A and 7B are respectively schematics showing respectively a digital cross-connect node of a network and an add-drop multiplexer node of a network

DETAILED DESCRIPTION OF PREFERRED EMBODIMENTS OF THE INVENTION

Figure 1:
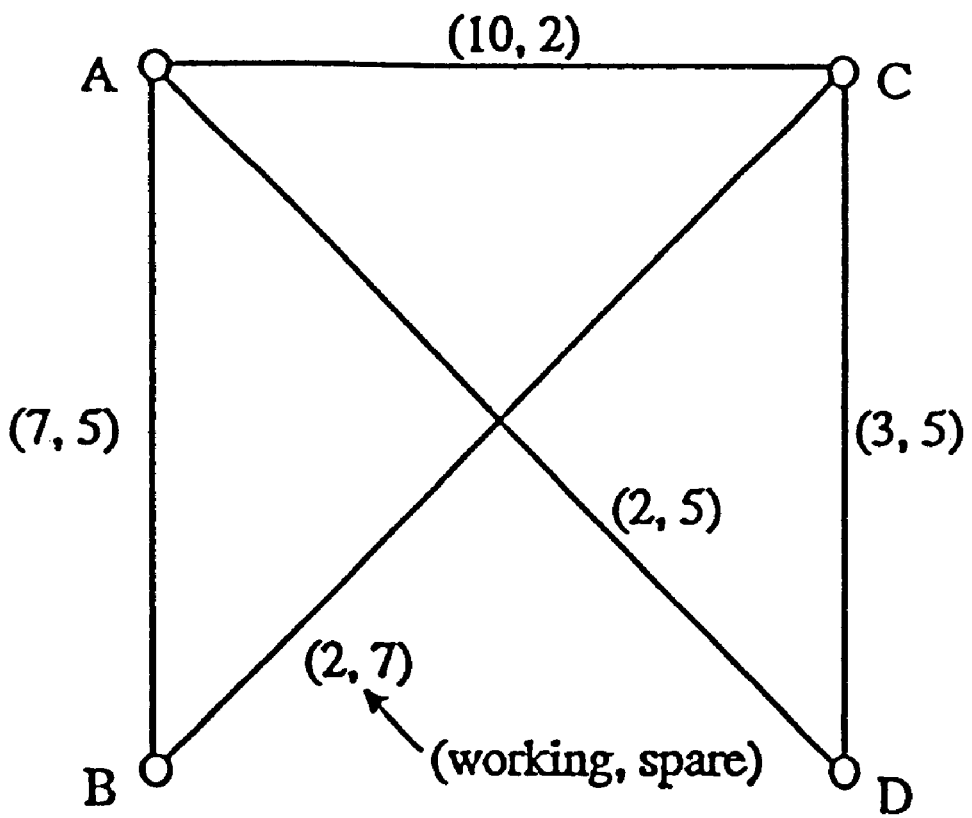
FIG. 1 is a diagram illustrating the forcer concept.

This work relies on a number of specialized terms from the field of restorable network design and the SONET (Synchronous Optic Network) transport networking environment. While references [4–6] give a full background, some key terms and concepts are reviewed here, so that the rest of the paper can be more clearly followed.

In modem communication networks, services such as voice, data, videoconferencing, Internet, private networking, credit verification, and so on, are aggregated on to a relatively few backbone fiber-optic systems by multiplexing the payloads into a set of standard-rate digital carrier signals (such as DS3, STS1, STS3c). Each fiber-optic transmission system consists of a fixed infrastructure of transmission facilities, which bear whatever set of carrier signals that are presented to their inputs. The inputs and outputs from the transmission facilities are interconnected by ADMs 10 (Add-Drop Multiplexers) in rings (FIG. 7B) and DCSs 12 (Digital Cross-connect Systems 12) in the mesh (FIG. 7A), to create a vast number of logical transport configurations from the same physical infrastructure. Thus, the transport network environment can be seen as a digital carrier signal management layer, in between the physical transmission facilities and the levels at which individual service connections and routing occur. Thus, the transport network design or configuration problems should not be confused with traffic-domain issues, such as the dynamic routing of individual calls or packets, which occur within the logical networks formed in the transport network.

In a restorable transport network, spare capacity is designed into the spans, allowing them to take on the additional load of re-routed payload signals (restoration pathsets) that result from a failure. This ensures the survival of these signals in the event of a cable cut and, in some cases, also protects transiting traffic from node loss. Each span has a number of working payload signals traversing it, as well as a number of standby signal units or "spare links". We use the term link to denote an individual bidirectional digital carrier signal between adjacent nodes at the signal management level of the relevant nodes (i.e. ADM's or DCS). For instance, a link may be a DS-3, STS-1, or STS-N carrier signal. With recent developments in dense WDM, a link may also be an individual wavelength. A span is the set of all working and spare links in parallel between adjacent nodes.

In the design of a mesh-restorable transport network, a central problem is to find the number of spare links for assignment to each span, such that the total spare capacity is a minimum, and all possible span failures are fully restorable by rerouting with the surviving spare capacity. This is called the spare capacity placement (SCP) problem. Restoration rerouting can be done in two ways: span or path (each with their corresponding SCP problem). For span restoration, the restoration paths run between the nodes adjacent to the failed span (i.e. recovery is by a rerouting locally around the break). In path restoration, the restoration paths run end-to-end from the origin to the destination of each affected demand pair [7]. For the mesh part of the present work, span restoration will be the focus. The SCP problem for a span restorable network was solved by Herzberg and Bye [8] using an IP method. We use this method for our pure mesh baseline designs in the present work.

In rings, spare capacity is not shared between the various rings (nor, at this stage in our work, is it shared with the mesh). Each ring contains the protection bandwidth needed to restore all demands routed over any one span in that particular ring. Routing is also much simpler, with the restoration path being the reverse direction from the failure and traveling around the ring. It should be noted that in the following work, the rings that are placed may be either UPSR or BLSR [5] types. The point is that the ring, despite differences in internal workings, appears to the optimization problem as a self-contained subsystem whose relevant attributes are only its cost (this includes its internal spare capacity) and working capacity.

A common model for the restoration routing employed for span restoration in a mesh network is k-shortest-paths (ksp). In this model, the set of paths used for restoration of any span cut is equivalent in number and total length, to the process of first finding all paths on the shortest route through the set of surviving spare links, then finding all paths on the next-shortest route (not using any links of the first), and so on. This routing characteristic has been verified as an accurate approximation for real distributed restoration processes such as the Self-healing Network protocol [9]. It is also negligibly different in terms of restoration efficiency from the ideal maximum flow criterion in typical transport networks [10]. We will now proceed to link these points about span restorable meshes, rings, and mesh rerouting into an overall framework for ring-mesh hybrid network design, starting with the forcer concept which underlies the mesh SCP problem.

The forcer concept can be used to reveal the spans driving the sparing requirements of the mesh. It is the knowledge of these spans and their "forcing strengths" (in the sense to be defined), that guides the heuristics (given in a following section) toward a beneficial ring placement.

The forcer concept is best explained through an initial statement of the concept followed by a small example. A forcer span is a span in a mesh restorable SCP solution which, as a potential failure, requires more sparing on one or more other spans than does any other potential failure span. To further specify this notion, FIG. 1 shows a four-node network with a fully survivable set of working and spare capacity allocations for each span. If span AC is cut, its 10 working links will be restored via five replacement paths on route ABC and five on route ADC. At least five spares are therefore needed on spans AB, BC, AD and DC. However, span BC has 7 spare links. This is due to consideration of span AB as a failure span. Should span AB fail, its seven working links can only be restored by paths involving span BC. A feasible restoration path-set is five paths on route ADCB and two paths on route ACB. Span BC is common to both of these simultaneously required routes, and therefore must have at least seven spares. Thus, regardless of the fact that no other span needs more than five spare links on BC, span AB requires seven spare links on BC for the network to be 100% restorable under all span cuts. Thus, we say that span AB is the forcer of span BC in the SCP plan of the network in FIG. 1. In other words, no other span requires more spares on BC, than span AB does.

Note, that although span AC has the largest working capacity in the network, it is the smaller demand on AB that is the forcer for span BC in this network. Similarly, inspection shows that in this small network, span AC is the forcer of spans AB, AD, and DC. In other words, if the working capacity of span AC was increased by one link, then the sparing on some of these spans would also have to be incremented to retain full restorability. Should span AC be altered in this way, increasing the sparing on span AB to 6 would be the least costly way to ensure full restorability. Because span AC does not force span BC, the addition of a single spare link on span AB creates the needed path (ABC). A more costly alternative, would be to increase the sparing on spans AD and DC to 6 (providing an additional path ADC). The forcing relationship conversely implies that if a working link were removed from AC, then a spare link could be removed from any spans that are uniquely forced by AC. In this case, AB is such a span. Note, that the uniquely forced spans (or spans) must be part of the restoration path that is removed. Here, that path would be ABC. By comparison, removing path ADC would not result in a reduction of sparing, because spans AD and DC are also forced by span AB.

In general, the forcer concept states that for any span j, there will always be some other span i, which will require a number of spare links on j, that is equal to or greater than that required by any other failure span. When this relationship is true, we say that span i is the forcer of span j. As we have already seen (in FIG. 1), more than one span may equally force the number of spares on span j (as AC and AB do on AD and CD). A formal definition of a forcer span is a span that requires an increase in network total sparing, for full restoration of any increase in its working capacity. It is necessary to base this definition on an increase in working capacity. The existence of spans that are forced equally by multiple spans, eliminates the possibility of defining a forcer span as being a span for which a reduction in network total sparing necessarily results from a decrease in its working capacity, although in practice the latter will often be true.

Clearly, forcer relationships depend on the working capacities of the spans in relation to the surrounding topology. Therefore, changing the working values can change the relationships. For example, removing 4 working links from span AC would change its forcing relationship with span AB. It would no longer force that span, and span BC would be the new forcer of span AB (forcing it to have 2 spare links). In the network's original state, span BC is a non-forcer, because it can more than restore its working links using the sparing that exists for other span failures.

It follows that a non-forcing span is one that can take on additional working capacity, without requiring additional spare capacity for the network to remain fully restorable. Accordingly, every span is either a forcer or a non-forcer in any given spare capacity design. The subset of spans which are forcers in a given network design, is called the forcer skeleton. This term is used, because these spans alone are sufficient to generate the entire spare capacity plan. If the working capacities of the non-forcing spans were set to zero, the same network spare capacity plan would still be required for survivability. In FIG. 1, for example, the forcer skeleton consists of spans AC and AB. The forcer skeleton is identified by the following process.

The forcer analysis of real networks must realistically be done by computer. Only on small networks such as in FIG. 1, can this be done by inspection. The forcer analysis program is, however, functionally similar in operation to the inspection process used in the previous subsection. Obviously, before a forcer analysis can be done, the number of working and spare links for each span must be already given or determined. Once this information has been obtained, the forcer analysis program proceeds to consider each span in isolation as a failed span. For each span failure, the restoration path-set is determined by a ksp routing algorithm [11] within the available spare capacity. For each span in the path-set, the number of spares used by all the restoration paths for this particular failure, are noted. Any of the spans in the path-set that have all of their spare capacity used by this particular failure, are being forced (perhaps not uniquely) by the failed span. If there are no spans which have their spare capacity exhausted by this failed span, then the failed span is a non-forcer. To state this algebraically, let Si be the number of spare links used on span i in response to failed span x, and Si be the number of spare links available on span i. If $S_{ix} < S_i$, then span x is not a forcer of span i. If, for every span i≠x, $S_{ix} < S_i$, then span x is a non-forcer. However, if there exists a span i for which $S_{ix} = S_i$, then span x is a forcer of span i.

The results of a forcer analysis not only indicate which spans are forcers, but also give an indication of the "strength" of each forcer in the aforementioned sense, also called its threshold. A forcer's threshold is the number of working links that would have to be removed, for that span to become a non-forcer (if all other working and spare quantities are maintained). Non-forcers can, in this regard, be thought of as spans that have a negative-valued threshold, representing the number of working links that can be added to the span, before it becomes a forcer. Large negative forcer thresholds show that the network as a whole is not nearly as sensitive (or costly) to growth on some spans as on others. This is a valuable insight and leads to other uses of the forcer concept, which we now mention before proceeding to the use of forcer analysis in hybrid design.

Forcer analysis can be used in provisioning new service growth, by guiding the routing of this additional demand. By avoiding forcers, one can avoid costly increases to the spare capacity that are necessary for survivability. Another application is to use this information to achieve better demand routing. Where nearly equal length route options exist, the forcer considerations could be applied to choose one route over the other, based on minimizing the impact on the network's spare capacity plan. Other routes could be examined in this light, as well. When the shortest path demand routing has the effect of creating a strong forcer, alternative routes might be considered to reduce the forcer and its SCP design.

The determination of positive forcer thresholds can be accomplished in two ways. The first is a static approach where the thresholds are calculated from spare usage information that is generated by the span failure analysis. When a particular span is examined as a failed span, it is possible to determine the spare capacity use this failure has on all the other spans in the network. Thresholds are then the difference between the forcers use of a forced span's sparing (which is all of it) and the next highest use of sparing on that span by any other failed span. Since forcers commonly force multiple spans, the sum of these differences would yield the forcer's threshold. The second approach is a dynamic one, where the thresholds are calculated by lowering the working capacity of the forcer and recalculating the SCP plan to determine if the former forcer span still forces any spans. The working capacity must be lowered to the point where the forcer no longer forces any spans, with the total reduction being the threshold. This requires several reduction steps, resulting in repeated calculation of the optimal SCP and considerably more computational effort than the first approach. Optimality is required in this case (for the SCP), in order to obtain true forcer relationships. The current algorithm uses the second approach and steps down the working capacity of the forcer (a binary sectioned search can be used to converge faster on the threshold point). It is not known which of the two approaches produces more accurate thresholds (a possible area for future study). But the computational requirements of the second approach, rule it out for larger networks. The negative threshold values, however, are more easily obtained The ksp routing algorithm can be run until exhaustion of the network sparing (the depletion of spares on the restoration routes), for the maximum number of paths possible.

Figure 2:
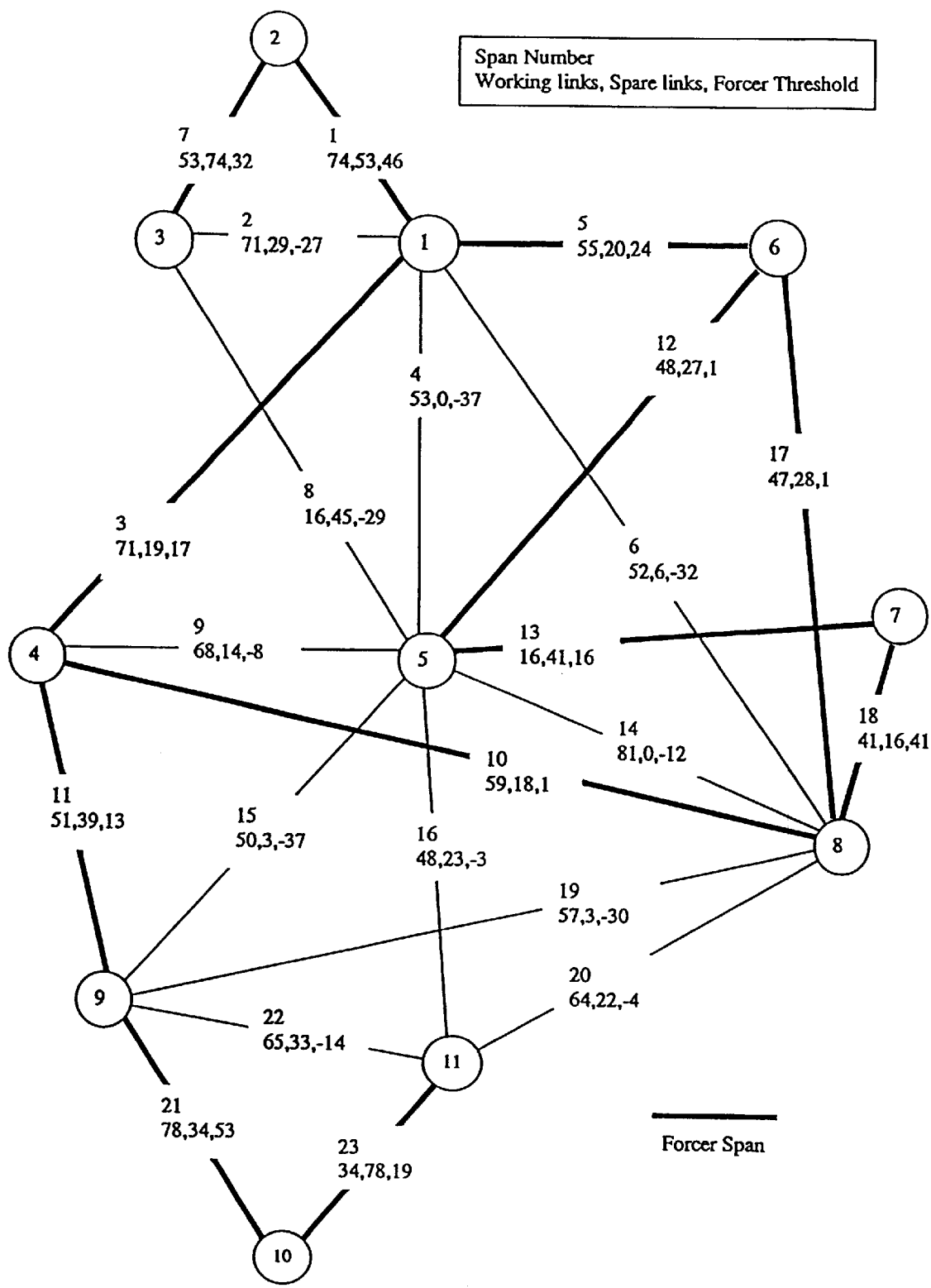
FIG. 2 is a schematic showing a forcer skeleton of network #1.

FIG. 2 shows the results obtained from a forcer analysis of one of the test networks (Network #1). The working link quantities for the test case were obtained from shortest path routing of the demand matrix over the topology. The spare link quantities were determined by Integer Programming and CPLEX [15] software for an optimum SCP plan with 100% span restoration. The method is similar to that used by Herzberg and Bye [8], with the exception of there being no hop limit in this case. The top number annotating each span in FIG. 2, is simply a label number. Below it, the working capacity, spare capacity, and forcer threshold of the span is given. The heavier lines denote forcer spans.

The properties and inherent nature of forcer spans, gives rise to a hypothesis for integrating rings into the mesh network and reducing overall cost. The hypothesis is that a bidirectional line switched ring might be placed on the mesh network to 'clip the tops' off of one or more of the forcer spans. This would have a leveling effect on the mesh residual, reducing its spare capacity cost. Opportunity for cost reduction would exist if the cost of the ring is less than the net savings in the underlying mesh layer (after its spare capacity plan is re-optimized). This hypothesis is first examined by describing the problem mathematically, in the form of an integer linear program. When put in this form, the problem can be solved by optimization software (i.e. CPLEX). The results of the optimization, provide a baseline and lower bound for the results of a further examination of the hypothesis by a heuristic approach. The two sets of results also serve to verify each other.

To complement the work on heuristics, to provide reference solutions, and to further define the problem structure, we have developed an Integer Programming formulation which combines the basic SCP problem and the ring placement problem of the current paper. The two problems have been woven together, as the solution involves restoration with the most cost efficient combination of mesh and ring spares. The problem formulation is as follows:

$$\text{Minimize} \sum_{i=1}^{S} c_m(s_i + w_i) + \sum_{r \in R} \sum_{i=1}^{M} c_i^r n_r \delta_{ri} \quad (1)$$

Subject to the constraints that (2) the mesh must be restorable, (3) the mesh working capacity is reduced by rings, (3) restoration sparing for the residual mesh and (4) ring capacity is modular (3 OC-n sizes), as set forth in the following:

$$\sum_{t \in Y_i} X_{it} = w_i \ i = 1, \ldots, S \quad (2)$$

$$w_i + \sum_{r \in R} \sum_{k \in S_r} C_{rk} \geq w_i^o \ i = 1, \ldots, S; \forall k = i \quad (3)$$

$$\sum_{t \in Z_k} X_{tt} \leq s_k \ i = 1, \ldots, S; \forall k, k \in V_i \quad (4)$$

$$C_{ri} = c_1 \delta_{r1} + c_2 \delta_{r2} + c_3 \delta_{r3} \ \forall r, r \in R; \forall i, i \in S_r \quad (5)$$

$$s_i \geq 0 \text{ and integer } i = 1, \ldots, S \quad (6)$$

$$w_i \geq 0 \text{ and integer } i = 1, \ldots, S \quad (7)$$

$$C_{ri} \geq 0 \text{ and integer} \forall r, r \in R; \forall i, i \in S_r \quad (8)$$

$$X_{it} \geq 0 \text{ and integer } i = 1, \ldots, S; \forall t, t \in Y_i \quad (9)$$

$$\delta_{ri} \in \{0, 1\} \ r \in R; i = 1, 2, 3 \quad (10)$$

Where, for convenience of understanding, the variables can be grouped as mesh or ring-related. The mesh variables are S is the total number of spans in the network $c_m$ is the cost of a link (working or spare) in the mesh $s_i$ is the number of spare links on span i in the final mesh component $w_i$ is the number of working links on span i in the final mesh component $w_i^o$ is the number of working links on span i in the initial pure-mesh design t indexes the distinct restoration routes available for a given span failure i $Y_i$ is the set of all available restoration routes for span failure i $X_{it}$ is the number of restoration paths selected to follow route t for span failure i in the final mesh design $Z_{ik}$ is the set of all mesh restoration routes that use spare links on span k when span i fails $V_i$ is the set of spans used for restoration when span i fails The ring-related variables are r is an elemental cycle that is unique in its size and location R is the set of all elemental cycles on which rings may be placed M is the number of ring modularity's (sizes) under consideration $S_r$ is the set of spans in cycle r $c_i^r$ is the cost (per span) of a ring of the $i^{th}$ modular capacity (i∈1. . . M)

$n_r$ is the number of spans in cycle r, $n_r = |S_r|$ $C_{rk}$ is the total working capacity displacement possible in the mesh due to span k in cycle r $\delta_{ri}$ is a Boolean decision variable which generates the modularity (size) choice for the ring placement on the cycle r. It is equal to 1 if the $i^{th}$ module size is chosen for a ring on cycle r, and is 0 otherwise.

The objective function sums the cost of the spare and working links used in the mesh component and the cost of the ring systems placed. The cost of a mesh span is determined by multiplying the mesh link-cost coefficient by the number of links (spare and working) in the span The overall cost of the mesh is found by summing over all the spans in the mesh. On the other hand, the cost of a ring is dependent on the number of spans the ring covers and the modular capacity of the ring (i.e. OC-12, OC-48 etc.), which includes its built-in sparing and is regardless of its actual working capacity utilization. The ring cost coefficient takes into account an economy of scale factor in modular rings. Larger rings have a lower per link cost. The rule of thumb which we employ is that it costs twice as much to obtain four times the capacity. The ring cost coefficient also has a component that reflects a user's overall view of the relative cost of ring and mesh networking on an average unit bandwidth basis. This component would be due to such things as rings having lower termination costs. The ring cost coefficient is then the cost, per span, of a given modular ring size times the overall bias factor presumed for ring technology cost advantage. For example, the cost coefficient for an OC-48 with a bias factor of 0.8 is 54.3 (48×2×0.707×0.8).

The first set of constraints ensures that the working links of each span of the mesh component are taken care of by sufficient restoration paths (full restoration). In the second set of constraints, the working capacities of the mesh and rings placed must satisfy the demand The third set of constraints ensures that the restoration is feasible for the working capacity left in the mesh component. In the fourth set of constraints, the ring capacity is limited to the available modular sizes. In our results, three ring sizes were used, with capacities $c_1$, $c_2$, and $c_3$, of 12, 24, and 48 respectively. Since all three ring sizes can be placed on a given cycle (by placing three rings), the mesh capacity relief can have a variety of values (0, 12, 24, 36, 48, 60, 72, and 84). The remaining constraints ensure that variables are either non-negative and integer, or binary (ring placement variable).

This formulation was used to generate IP tableaus with AMPL (a modeling language for mathematical programming) [16], which in turn were solved by CPLEX [15] optimization software. This approach had limited success on the test networks that we used, When the number of nodes and spans of the mesh network were relatively low, the optimal method performed well. However, the increase in the combinatorial size of the problem with an increase in the number of nodes and spans, overwhelms this approach and makes a heuristic necessary. For example, a 15 node, 28 span network generates over 20,000 variables and 50,000 constraints. For larger networks, there needs to be a relaxation of optimality tolerance and even that may require excessive memory/computation time, hence the need for a heuristic.

Figure 3:
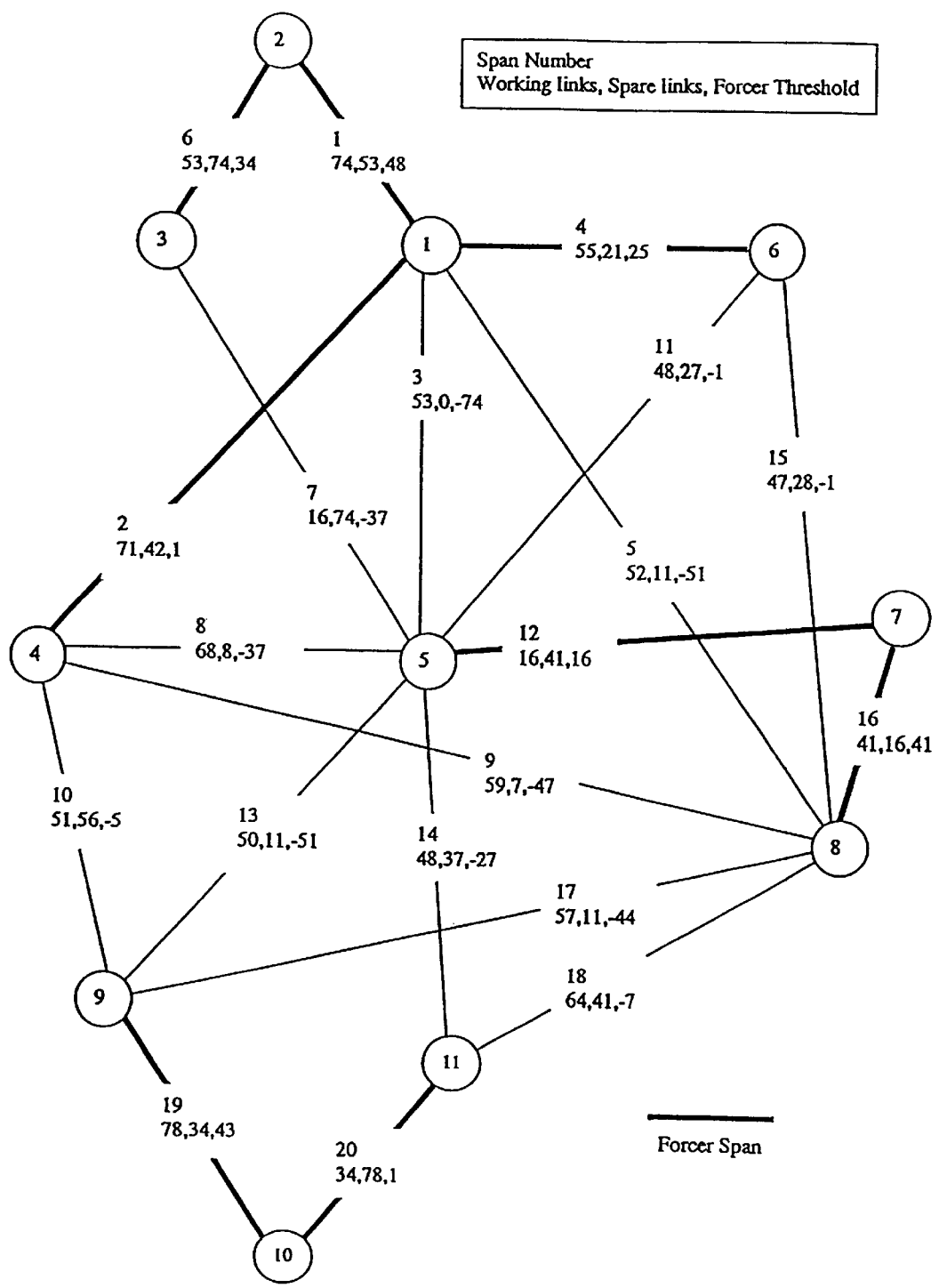
FIG. 3 is a schematic showing a forcer skeleton of network #2.
Figure 5:
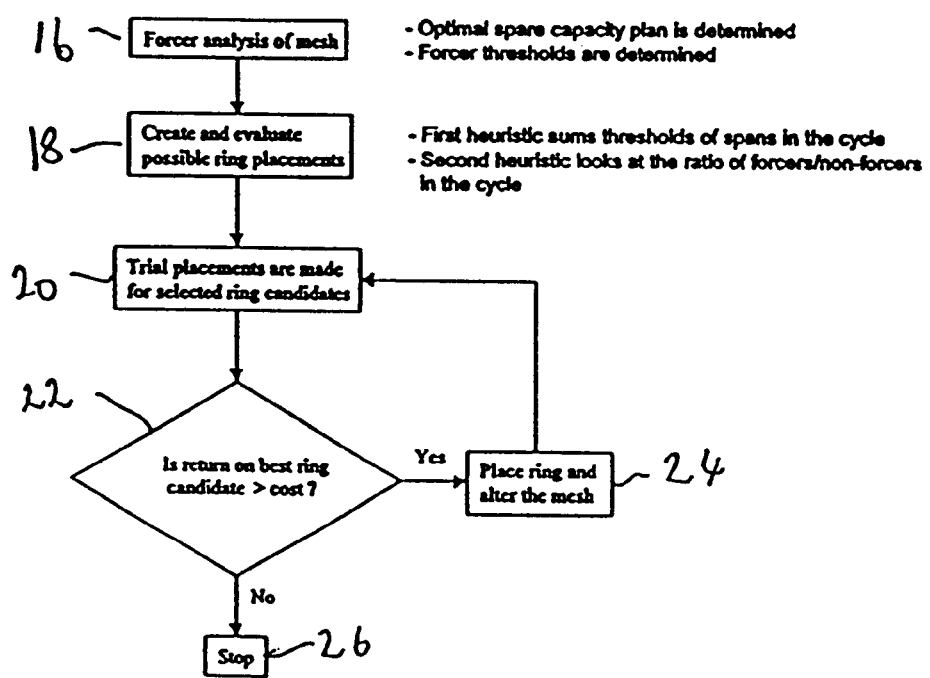
FIG. 5 is a flow diagram showing operation of a heuristic for finding an optimal ring-mesh hybrid.
Figure 6:
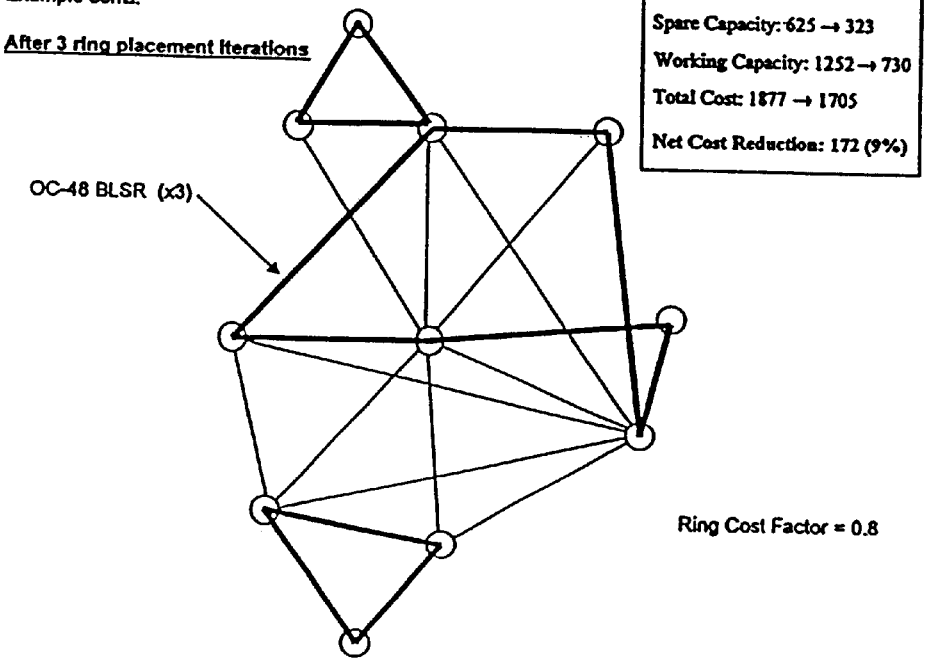
FIG. 6 is a schematic showing an exemplary ring placement after a series of iterations of the method of the invention.

Two heuristic algorithms were developed to place rings within a mesh network, based on the forcer-clipping hypothesis, finding opportunities where it may be most effective to do so. The algorithms use the information contained in the forcer skeleton to generate a set of promising ring placement candidates. These rings differ in their length (the number of spans that they contain) and their topology (the ring's cycle). The heuristics differ in the manner in which the merit of the prospective rings is evaluated. Both algorithms may be described generally by FIG. 5. First, forcer analysis 16 is applied to the mesh An exemplary forcer skeleton is shown in FIG. 3. Then, a set of good candidate rings is identified based on forcer-clipping assessments 18, and trial placements are made with these candidates at 20, as for example shown in FIG. 6, in which exemplary rings after 3 ring placements are shown for the forcer skeleton of FIG. 3. After applying a cost model 22 and revising the mesh layer design 24, place the best ring if it is profitable to do so and if not, do nothing 26. The capacity return factor is the ratio of the total capacity reduction of the revised mesh design relative to the total capacity embodied in the proposed ring under assessment. Capacity may be assessed either as bandwidth units×km or simply as bandwidth×hops of the spans involved in both ring and mesh capacity effects. A more detailed description of the procedure follows.

The SCP problem of the initial pure-mesh network is solved.
  a) IP tableau is generated.
  b) The IP problem is solved with CPLEX
  c) The total spare capacity is obtained from the solution.

Any method for the exact or approximate solution of the mesh SCP problem could be used for the purposes of this step (including LP relaxation's of the IP for the SCP)] All possible elemental cycles of the network graph are generated The forcer-clipping merit and ranking of each ring candidate, or cycle, is determined.
  a) Forcer analysis of the network is done.
  b) Measure of merit is calculated for each ring candidate using the results of the forcer analysis.
  c) The top-ranked candidates (by the criteria of 3.) are stored in a working set. The size of the set is a user-defined parameter.

Main loop: This loop continues until the economic return factor of the best ring is lower than the cost factor between ring and mesh links. This cost factor is a user-defined parameter.
  a) Secondary loop: This loop continues until all the candidate rings in the working set have been tested.
    1) Place candidate ring (This includes a presumed modular size for the ring under test).
    2) Create IP tableau for the modified mesh design.
    3) Solve the relaxed IP problem with CPLEX.
    4) Obtain the new spare capacity total from the solution.
    5) Calculate the mesh spare capacity displacement (spare total before—spare total after).
    6) Calculate the mesh working capacity displacement (working total before—working total after).
    7) Calculate the capacity return factor by dividing the total capacity displacement by the capacity of the ring (# of links x # of spans).
    8) Calculate the economic return factor (capacity return x mesh cost/ring cost), where mesh cost=1 and ring cost=economy of scale factor x cost factor.
    9) Compare the ring's economic return factor with the best found so far (the first ring excluded). It replaces the incumbent if its return is larger. In the event of a tie, it replaces the incumbent if it has more spans.
  b) If the economic return factor for the best ring is greater than 1, it is placed and the mesh permanently altered. Information on placed rings is stored, The results are printed to file. The details include ring size, layout, and net economic return.

Both heuristics that were developed follow the same basic process above. It is in step 3, however, where the two methods differ. The first heuristic evaluates the candidate rings by using the forcer threshold magnitudes. The sum of the threshold values for each span in a ring is the measure of merit for forcer-clipping strength. Prospective rings which group together many forcers, or at least a few strong forcers, will have large positive sums and thereby are expected to relieve the most sparing in the underlying mesh. It is this mesh sparing relief (a widespread effect in the mesh requiring its SCP to be redesigned), which varies from ring to ring, that will affect the capacity return factor a ring produces. Working capacity relief in the mesh is equal to the number of working links in the ring being placed, if there exist in the mesh that number of working links to relieve. If not, the relief is limited to the number of working links that exist in the mesh.

It was observed during the numerical tests, that the first heuristic was only considering rings with a large number of spans (smaller rings collecting together fewer forcers that can contribute to the overall figure of merit in step 3). It is desirable to consider these smaller rings, however, since they can have very high capacity return factors. A second heuristic was developed in an effort to include them. Here, the simple number of forcers that a ring would group together determines whether or not it is included into the working set For the latter heuristic, each ring is evaluated by dividing the number of forcers in the ring, by the number of spans in the ring. This heuristic has the computational advantage of not requiring the determination of forcer thresholds, which were a part of step 3 for the first heuristic. Only the logical forcer/non-forcer status of each span is needed. An alternative to this, is to introduce the notion of significant forcers. In this case, spans that are strictly logical forcers, but with thresholds of only 1, 2, . . . etc., are disregarded as forcers. These was done for test cases where many forcers existed, and it was necessary to focus in on only the stronger ones. Prospective rings would then be evaluated on the number of significant forcers that they contain. This focuses the heuristic on the cycles that contain the strong forcers, and doesn't allow weak forcers to exert undue influence.

Test Methods and Results

Test Methodology

A set of results for the optimal problem formulation and for both heuristics was obtained. These test the theory and formulations, and give an initial quantitative indication of the possible benefits to network operators. Four test networks were used.

Figure 4:
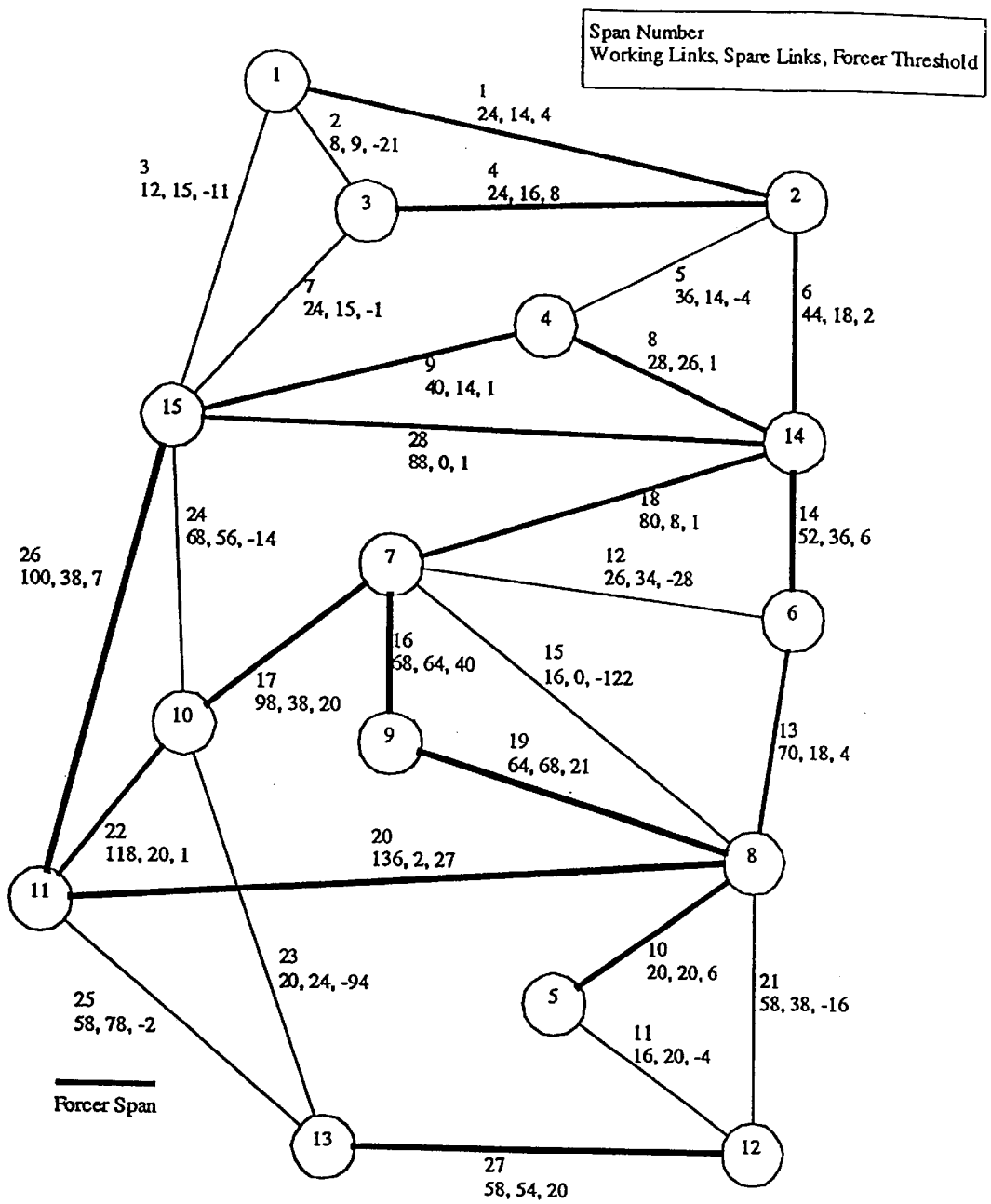
FIG. 4 is a schematic showing a forcer skeleton of network #3

Network #1 is a U.S. metropolitan area network first used in [12] and again in [13]. This network comes complete with a demand matrix (provided by Bellcore [13]), which we reuse. Networks #2 and #3 were obtained from modifications to network #1, providing test cases with a variety of characteristics. Network #2 was created by eliminating spans 2, 14, and 22 from network #1 (see FIG. 2). The purpose was to have an otherwise related test case, but with a lower nodal degree (in keeping with some actual networks) to create a test case where the relative diversity of forcer strengths may be larger than in the base network #1. Network #1 has an average nodal degree of 4.2 (a rather high value), whereas network #2 has an average nodal degree of 3.6. Network #3 is another variant of network #1, where 3 more nodes and 5 more spans were added. This results in a test network with an average nodal degree of 3.7. The topology of networks 2 and 3, as well as other relevant information, is shown in FIGS. 3 and 4. Network #4 has 19 nodes, 37 spans, and an average nodal degree of 3.9. It is a network of the main cities of Europe [17].

The demand matrix of network #4 was generated by multiplying the degree of the two nodes and dividing by the straight line distance between them. In all test networks, the working capacities for each span in the initial pure-mesh design were generated by mapping the end to end demand matrix onto the spans using shortest path routing. The spare capacities for the spans in the baseline pure-mesh case, were then determined by the Integer Programming method for [8], solved with CPLEX Table 1 summarizes the characteristics of each test network.

TABLE 1

Characteristics of the test networks (pure mesh baseline designs)

| Network | No. of Nodes | No. of Spans | Initial Pure-Mesh Design (Links) | | |
|---|---|---|---|---|---|
| | | | Working | Spare | Total |
| 1 | 11 | 23 | 1252 | 625 | 1877 |
| 2 | 11 | 20 | 1035 | 670 | 1705 |
| 3 | 15 | 28 | 1454 | 757 | 2211 |
| 4 | 19 | 37 | 1420 | 619 | 2039 |

Results and Discussion

The results are summarize in Tables 2 and 3. They show reductions in network cost ranging from 5.4% (network #3 in Table 2) to 25.2% (network #2 in Table 3). Given the very large cost of real networks in general, these reductions represent a substantial savings. There are a couple of observations to note. First, the savings and the number of rings placed are greater when a lower ring cost factor is used. This is intuitive, since the algorithms are able to build the network and satisfy demand with lower cost components. Secondly, some of the mesh networks are far more amenable to ring placement than others. Table 2 shows that network #2 achieves more than twice the percent reduction that network #3 does. We hypothesize that the ruggedness of the forcer structure is related to this effect. However, Table 3 shows that the ring/mesh relative cost does affect how receptive a mesh network is to rings. Network #3 in Table 3 is far more amenable to ring placement than it was when the ring cost factor was higher (in Table 2). In general, the heuristic approach compares well to the optimal solution method. In those cases where the heuristic produced a solution of considerably lower quality, it did so in much less time. There are examples of this in Table 2 with heuristic #1 and network #1, and in Table 3 with heuristic #1 and networks 1 and 3. So the solution quality/time quotient is consistent over the three solution methods. Heuristic #2 looks to be the better of the two, since it does not return the occasional poor value like the other heuristic. Again, this is at the expense of more execution time than the first heuristic. Lastly, the optimal solution method fails in both solution quality and time for networks 3 and 4, where network size creates a combinatorial explosion. Table entries that have been dashed out, signify that no solution was found. For example, for network #4 in Table 2, the optimal solution method failed to find a solution (better than the initial state (pure mesh)) in 200 hours of computation.

TABLE 2

Total cost and execution times for rings with a cost factor of 0.8

| | Network #1 11 nodes 23 spans | Network #2 11 nodes 20 spans | Network #3 15 nodes 28 spans | Network #4 19 nodes 37 spans | Average cost Savings % |
|---|---|---|---|---|---|
| Initial Mesh (reference case) | 1877 | 1705 | 2211 | 2039 | — |
| Heuristic #1 | 1750 (6.8%) 7.3 min 1 ring | 1504 (11.8%) 1.7 min 1 ring | 2092 (5.4%) 50.8 min 1 ring | | 8.0 |
| Heuristic #2 | 1705 (9.2%) 20.1 min 3 rings | 1509 (11.5%) 2.1 min 1 ring | 2092 (5.4%) 38.4 min 1 ring | | 8.7 |
| Optimal Solution Method | 1667 (11.2%) 36.9 min 4 rings | 1487 (12.8%) 6.3 min 3 rings | 2088 (5.6%) 25.3 hrs 4 rings | — | 9.9 |
| LP Lower Bound | 1617 | 1437 | 1888 | 1773 | — |

The objective function values (total costs) were determined by assigning 1 to the cost of a mesh link, and using the ring cost factor and the economy of scale factor, to obtain the cost of the unit of bandwidth in the respective ring (considering its module size for the economy of scale effect). Ring links were presumed to cost 20 and 40% less than mesh links; resulting in scaling factors of 0.8 and 0.6 respectively. (The authors' contacts with industry lead us to believe that this is a realistic range for the overall relative cost of ring verses mesh technology. The above amounts to the view that per unit bandwidth, an OC-24 costs 0.8 to 0.6 of a mesh unit bandwidth, and the further relative cost penalty or benefits apply to OC-12 and OC-48 rings respectively.) The economy of scale (relative cost) factors used were: 1.4 for an OC-12, 1 for an OC-24, and 0.707 for an OC-48.

However, the combinatorial problem was of such a size that priority assignment in itself was not enough. The second time-saving technique that was employed was a relaxation of the optimality tolerance. The branch-and-bound algorithm terminates when the following is true: (best integer solution −best node)<optimality tolerance. The node file (containing the tree information) is kept in check by cutting off nodes that do not contain solutions that are better than the current integer solution (or best found so far) by at least the optimality tolerance. In the branch-and-bound algorithm, nodes are evaluated by relaxing the integer constraints, and solving the remaining linear programming problem. The solution to the linear programming problem gives a lower bound for the node. If this lower bound is not less than the current integer solution by the optimality tolerance, it is

TABLE 3

Total cost and execution times for rings with a cost factor of 0.6

|  | Network #1 11 nodes 23 spans | Network #2 11 nodes 20 spans | Network #3 15 nodes 28 spans | Network #4 19 nodes 37 spans | Average cost Savings % |
|---|---|---|---|---|---|
| Initial Mesh (reference case) | 1877 | 1705 | 2211 | 2039 | — |
| Heuristic #1 | 1589 (15.3%) 10.5 min 2 rings | 1350 (20.8%) 2.5 min 2 rings | 1913 (13.5%) 2.1 hrs 3 rings |  | 16.5 |
| Heuristic #2 | 1507 (19.7%) 20.9 min 4 rings | 1373 (19.5%) 2.1 min 1 ring | 1740 (21.3%) 4.4 hrs 4 rings |  | 20.2 |
| Optimal Solution Method | 141.1 (24.8%) 10.9 hrs 5 rings | 1275 (25.2%) 31.2 min 5 rings | 1873 (15.3%) 23.3 hrs 8 rings |  | 21.8 |
| LP Lower Bound | 1311 | 1175 | 1473 |  | — |

Computational Experience & Tactics

All execution was done on a SUN Enterprise HPC450 computer with four 250 MHz Ultra Sparc II processors. The execution times for the optimal solution method are seen to be quite reasonable for networks 1 and 2 (under an hour for a cost factor of 0.8). However, there were a couple of measures that needed to be taken in order to accomplish this. These measures became essential for obtaining solutions when the execution time dramatically increased with a lowering of the ring cost factor (compare tables 2 and 3), creating many more ring placement opportunities.

The first time-saving technique used was the assignment of branching priorities. The branch-and-bound algorithm that CPLEX employs to determine the optimal solution for an IP problem, can be directed with a node selection strategy. This strategy will decide which node to next branch on when traveling through the tree structure (or solution space). Using AMPL it was possible to assign priorities to the decision variables in the IP formulation. The ring placement variable ($\delta_{ri}$) was given a high priority, and the ring capacity variable ($C_{ri}$) was given a low priority. Because so few of the rings in the complete ring set are placed, many of the ring capacity variables end up being zero in the optimal (or near-optimal) solution. Therefore, to help the branch-and bound algorithm avoid wasting time with these variables, they were given a low priority. The mesh spare and working link variables were given priorities that were neither high nor low. Experimentation with alternative priority settings showed these to be best. Priority assignment dramatically improved execution times over those obtained via default settings. In some cases, solutions were not even found using default settings.

fathomed. This also helps save time by not traveling down any branches that proceed from this node.

Even a moderate optimality tolerance can save a great deal of execution time. Trials involving absolute minimums showed that the CPLEX expended a large percentage of its total execution time, finding a solution (the optimum) that was only slightly better than one found much earlier in the search process. As the final solution gets closer to the optimal value, there is dramatic diminishing returns.

One final note regarding execution time, is that the time needed to obtain the forcer thresholds, should be added to the execution time for heuristic #1. This should be done, because this heuristic needs the thresholds as input before it can be run. These values were: 2.1 hrs for network #1, 15.9 min for network #2, 7.6 hrs for network #3, and 16.3 hrs for network #4. These times can be reduced by implementing time-saving techniques (for the optimal SCP problem) similar to those just described, but certainly makes heuristic #2 the more time efficient approach for small to mid-sized networks.

The main finding is that the "forcer-clipping" hypothesis seems to be a valuable insight on which a strong principle of ring-mesh hybrid design methodology can be based. Results show that it is possible to significantly reduce the cost of a mesh network (5 to 25% in our test cases), by incorporating rings, chosen on the basis of forcer-clipping effects, into the network structure. The placement and sizing of the rings that will achieve these savings, is a combinatorial optimization problem. For smaller sized networks, we have solved this problem using Integer Programming and have produced results that are near-optimal. However, this is not an option for networks with many nodes and spans. For these networks, we have presented a principle that guides the placement of rings within a heuristic algorithm. Forcer analysis highlights the spans that drive the sparing in a mesh network, and displacement of their working capacity into rings yields maximal sparing relief and consequently maximum economic benefit. The heuristic approach provides solutions that compare well against the optimal approach in terms of time and solution quality. More importantly, it also provides solutions where the optimal approach fails.

One reason that the forcer-levelling effect is not even more evident is that once placed (or during its assessment) an OC-n ring is not used only to remove forcer capacity. If the ring is to be adopted it has to be a complete entity, so it always makes sense to allow it to scoop the maximum $w_i$ quantity out of the underlying mesh on every span. Thus although motivated and selected by forcer-clipping effects, each ring removes more than just forcer capacity. This has the side-effect of re-creating a still fairly rough forcer landscape in the mesh residual. The mesh residual network would appear much more levelled in a forcer sense if the rings only shaved off forcer peaks. But this would be foregoing the maximum cost benefit of the ring.

Another validation exercise we performed was to take some test cases of the heuristic results and force them to place one more ring that they would otherwise have done. The heuristics normally stop when no further ring can be found that has a net positive payback. We wanted to validate that the total network cost did not just keep going down the more mesh capacity was replaced by rings. After all, from a purely 'bulk capacity' view, rings are given the advantage of being 20 to 40% cheaper than the same capacity in the mesh. So why is there an optimum at all? Why does the outcome not just slide to an all-ring solution? The reason (that this test confirms) is that the pure capacity cost is only part of the issue: To use a ring on a desired point to point segment one must somehow close the ring over other spans, and pay for those spans too. Thus, a ring can only be effective if circumstances coincide fairly well with the cyclical closure of the structure in some way over the network graph. If there are two spans that would do well with an overlying ring, but the topology will require another 8 spans to form a ring, then its economics are hampered. At the same time, as the mesh residual becomes more forcer-levelled, its efficiency goes up until some reasonably levelled forcer structure attains most to the achievable benefit. Thereafter, rings are less able to help pay for themselves by enhancing the mesh residual efficiency. Thus, there are two architectural phenomena working in the direction of retaining a mesh residual in the general case, even when ring capacity is unconditionally cheaper on a pure "bulk" basis.

To test this interpretation of why the heuristics and the optimal solver both do place several rings and stop even though rings are 'cheaper', we forced the heuristics to place the one next-best ring available after they would otherwise have stopped. In all cases the total design cost increased from placing any extra rings. The reason is the confirmation of our insights about hybrid design: As the first rings are added, they are well loaded, have good forcer-clipping effects to help pay for themselves by increasing the residual mesh efficiency, and are on cycles that can group together several forcers into one clipping ring. As the residual mesh gets an increasingly levelled forcer landscape the amount of working capacity that is better off left in the mesh goes up, the strength of remaining forcers is weakened and it becomes harder to find a ring that can efficiently group together numbers of forcers.

Although the balance point between ring and mesh component networks will be driven back and forth by the costs involved, we think the understanding of these architectural interactions is sufficient to say that in general some hybrid construction should be lower in cost than either a pure mesh or pure ring network, over a fairly wide range of relative costs. This is a significant change in viewpoint for the industry which has largely viewed the question (or debate) as one of whether to go all-ring or all-mesh. The more relevant question is, we think, how to coordinate the use of both canonical structures for minimum cost in a hybrid design.

It is believed on reasonable grounds that the following methods will improve operation of the invention. One is a modification of the second heuristic to involve a notion of significant forcers. Presently, spans that are logically forcers, but with forcer magnitude of only 1 or 2 units, can be seen as high-merit for a forcer-clipping ring. The idea is to apply a threshold of significance to the forcer magnitude before it is recognized as such, an example being one half or one quarter the smallest OC-n module available for an overlying ring. The determination of the best threshold to use is a matter of empirical experience depending on the number and size of modules involved in the design problem. It is also clear that a program for determining a binary (forcer / non-forcer) status can be much faster than one that must fully determination of the absolute forcer magnitudes, as for the first heuristic.

Another trade-off is that of using a larger working set size versus re-analysis of the residual mesh forcer structure after each ring placement iteration to maintain a smaller but more targeted working set. With a large working set, re-analysis may add little advantage, but more time is spent in detailed ring-placement trials in the main loop. A smaller working set would make the main loop faster but require a new outer loop to regenerate the working set after each iteration. A related refinement in assessing total forcer-clipping merit of a cycle would be to detect when the cycle unifies or collects together spans that co-force other spans in common. For instance, two spans may look like weak forcers individually but they are both strongly co-forcing some other span in common. In this case the idea is to give a ring that clips them off together the credit of their higher co-forcing magnitude. If removed together, the next latent forcer may be much farther down. This notion may be impractical computationally, due to the combinatorial nature of the possible combined forcing relationships. Heuristic #2, by seeking cycles with a high proportion of logical forcers, is more disposed than heuristic #1 to fortuitously include these relationships in its working set.

A final observation is that at present any prospective ring is used in a pure capacity-displacement mode, not in the technically superior sense of optimal ring loading. To explain; In this work any working capacity that is moved from the mesh up to an overlying ring is simply displaced upwards, without altering its basic route over the network graph. In true ring loading one considers the totality of demands whose routes intersect the prospective ring and solve an optimal loading problem to soak up as much demand as possible, allowing the possibility of changing the routing of demands while they are within the ring. That is, one may legitimately detour a certain demand segment to go the long way around the ring if it enhances the total demand serving capability of the ring. The entry and egress points of the demand segment seen by the mesh do not change in doing so, so there is no further complication in the overall algorithm. The only effect is that when a ring is being considered, it will generally be able to absorb more working capacity from the mesh than otherwise. This is an option that enhances the total load serving ability of BLSRs (not UPSRs) but is of practical interest because BLSRs are widely employed in core transport applications. The effects would be to increase ring efficiency, hence more rings yet greater cost savings would be expected. It is not known quantitatively how much of an effect this will have.

Overall, heuristic #2 would seem to be recommended since it is faster and does not return the occasional poorer result like the heuristic #1 (e.g., Net#3, $\Omega$=0.6). We think the explanation for this is that, although heuristic #1 better characterizes the presence of strong forcers, heuristic #2 is better at identifying cycles which contain many logical forcers. It was also observed during evaluation of the results that the first heuristic, was tending not to admit smaller cycles which had a large proportion of forcers. This is due to its nature of seeking the greatest (absolute) total forcer mass. A ring accumulating many hops of weak forcers and non-forcers may thus rank higher than a small ring that consists entirely of moderate forcers. Yet, it is desirable to consider these smaller rings of proportionately many logical forcers, as heuristic #2 does, since they can have high individual economic return factors. A further factor in heuristic #2s favour may be that it is more likely to admit cycles that embody hidden co-forcer effects. (This involves two forcers, each apparently weak because of the others co-forcing effect on common spans. But if clipped off together, they can release a more than expected amount of sparing.) Even if the working set selection heuristic does not explicitly detect such effects, once they are in the working set, the detailed costing of the main loop which includes residual mesh SCP re-design, will definitely capture the benefit. Notwithstanding these relative merits of the two heuristics, we would just point out that in a production system, an option would always be to pool the working set from both these (and/or any other) heuristics, thus ensuring (for a greater run time) that the best opportunities from either viewpoint should be captured.

Another investigation of the results looked to see if the basic hypothesis of forcer-clipping is evident in the optimal hybrid results (i.e., that the rings placed would inherently be rings that have a forcer-levelling effect). In all cases where the optimal results are available, we find that the post-design forcer analysis of the mesh residual confirms what we would expect from this hypothesis. Specifically, it follows that if forcer clipping rings time and solution quality. More importantly, it also provides solutions where the optimal approach fails.

We do not inspect the heuristic results for evidence of forcer clipping as the basis for cost reductions because they operate with this bias to begin with. It is in the optimal results, which are independent of any a priori notion, that we must look for a validation or refutation of the main hypothesis.

References

[1] W. D. Grover, "Network Survivability: A Crucial Issue for the Information Society", IEEE Canadian Review, Summer 97, No. 27, pp. 16–21.

[2] W. D. Grover, "Case Studies of Survivable Ring, Mesh, and Mesh-arc Hybrid Networks", Proceedings of IEEE GLOBECOM'92. December 1992, pp. 633–638.

[3] G. Brown, W. D. Grover, J. B. Slevinsky, M. H. MacGregor, "Mesh/Arc Networking: An Architecture for Efficient; Survivable Self-Healing Networks", in Proceedings IEEE International Conference on Communications (ICC '94), New Orleans, May 1994, pp. 471–477.

[4] W. D. Grover, "Distributed Restoration of the Transport Network", in Network Management into the 21st Century, editors T. Plevyak, S. Aidarous, IEEE/IEE Press co-publication, Chapter 11, pp. 337–417, February 1994, ISBN 0-7803-1013-6.

[5] Tsong-Ho Wu, Fiber Network Service Survivability, Artech House, Norwood, Mass., 1992.

[6] SONET/SDH: A Sourcebook of Synchronous Networking, IEEE Press, Editors C. A. Siller Jr., M. Shafi, 1996.

[7] R. R. Traschko, M. H. MacGregor, W. D. Grover, "Optimal Capacity Placement for Path Restoration in Mesh Survivable Networks", ICC '96, Dallas, June 1996, pp. 1568–74.

[8] M. Herzberg, S. J. Bye, "An Optimal Spare-Capacity Assignment Model for Survivable Networks with Hop Limits", IEEE Globecom '94, 1994, pp. 1601–1607.

[9] W. D. Grover, B. Venables, M. MacGregor, J. Sandham, "Development and Performance Verification of a Distributed Asynchronous Protocol for Real Time Network Restoration", IEEE J. Select. Areas Commun., vol. 9, no. 1, January 1991, pp 112–125.

[10] D. A. Dunn, W. D. Grover, M. H. MacGregor, "A Comparison of K-Shortest Paths and Maximum Flow Methods for Network Facility Restoration", IEEE J. Sel., Areas in Communications, January 1994, vol. 12, no. 1, pp. 88–99.

[11] M. H. MacGregor, W. D. Grover, "Optimized K-Shortest-Paths Algorithm for Facility Restoration", SOFTWARE Practice & Experience, Vol. 24, No. 9, September, 1994, pp. 823–834.

[12] C. H. Yang, S. Hasegawa, "FITNESS: Failure Immunization Technology for Network service Survivability", Proc. IEEE Globecom '88, pp. 47.3.1–47.3.5, 1988.

[13] Bellcore Special Report, SR-NWT-002514, "The Role of Digital Cross-Connect systems in Transport Network Survivability", Issue 1, January 1993.

[14] W. D. Grover, D. Y. Li, "The Forcer Concept and Express Route Planning in Mesh Survivable Networks", Journal of Network and Systems Management, in press.

[15] Version 5.0 of CPLEX Base System and Callable Library, ILOG Inc., CPLEX Division, Incline Village, Nev., USA, 1997.

[16] R. Fourer, D. M. Gay, B. W. Kernighan, AMPL: A Modeling Language for Mathematical Programming, boyd & fraser publishing company, Danvers, Mass. 1993.

[17] A. Lardies, A. Aguilar, "Planning Methodology for SDH+Optical Networks", Proc. First International Workshop on the Design of Reliable Communication Networks, 20, 1998.

We claim:

1. A method of improving sparing efficiency in a telecommunications network in which the telecommunications network has at least one forcer span that has a deleterious effect on sparing efficiency and in which the nodes in at least part of the telecommunications network are configured as a mesh network, the method comprising the steps of:

identifying a forcer span in the telecommunications network;

finding a placement of a ring in the telecommunications network that reduces the deleterious effect of the forcer span; and integrating the ring into the telecommunications network.

2. The method of claim 1, in which integrating the ring into the network makes the forcer span a non-forcer span.

3. The method of claim 2, in which finding a placement of a ring that reduces the deleterious effect of the forcer span comprises evaluating plural ring placements based on the cost of placing each ring in the network.

4. The method of claim 3, in which a ring is selected for placement in the network that is the most cost effective of the ring placements evaluated.

5. The method of claim 3, in which integer programming is used to evaluate the ring placements.

6. The method of claim 3, in which a heuristic is used to evaluate the ring placements.

* * * * *